United States Patent
Arvanitis et al.

(10) Patent No.: US 6,988,249 B1
(45) Date of Patent: Jan. 17, 2006

(54) PRESENTATION SERVICE ARCHITECTURES FOR NETCENTRIC COMPUTING SYSTEMS

(75) Inventors: Yannis S. Arvanitis, Hinsdale, IL (US); Stanton J. Taylor, Green Oaks, IL (US)

(73) Assignee: Accenture LLP, Palo Alto, CA (US)

( * ) Notice: Subject to any disclaimer, the term of this patent is extended or adjusted under 35 U.S.C. 154(b) by 861 days.

(21) Appl. No.: 09/677,135

(22) Filed: Sep. 29, 2000

Related U.S. Application Data

(60) Provisional application No. 60/156,962, filed on Oct. 1, 1999.

(51) Int. Cl.
G06F 15/00 (2006.01)

(52) U.S. Cl. ........................................ 715/853; 715/854
(58) Field of Classification Search ................. 715/853, 715/854, 851; 345/853, 854, 763, 762, 765, 345/851; 707/513, 514; 717/120, 121, 1, 717/10
See application file for complete search history.

(56) References Cited

U.S. PATENT DOCUMENTS

| | | | |
|---|---|---|---|
| 5,495,610 A | 2/1996 | Shing et al. ................. 395/600 |
| 5,535,388 A | 7/1996 | Takeda ........................ 395/650 |
| 5,590,270 A | 12/1996 | Tsukuda et al. ............. 395/701 |
| 5,602,997 A | 2/1997 | Carpenter et al. |
| 5,619,716 A | 4/1997 | Nonaka et al. ............. 395/800 |
| 5,710,915 A | 1/1998 | McElhiney ................. 395/603 |
| 5,737,533 A | 4/1998 | de Hond ................ 395/200.49 |
| 5,742,829 A | 4/1998 | Davis et al. ................. 395/712 |
| 5,745,753 A | 4/1998 | Mosher, Jr. ................. 395/618 |
| 5,758,150 A | 5/1998 | Bell et al. ................... 395/610 |
| 5,761,071 A * | 6/1998 | Bernstein .................... 700/237 |
| 5,781,732 A | 7/1998 | Adams .................. 395/200.35 |
| 5,799,297 A | 8/1998 | Goodridge et al. ............ 707/1 |
| 5,805,785 A | 9/1998 | Dias et al. ............. 395/182.02 |
| 5,835,090 A | 11/1998 | Clark et al. |
| 5,859,969 A | 1/1999 | Oki et al. ................. 395/200.3 |
| 5,860,012 A | 1/1999 | Luu ........................... 395/712 |
| 5,877,759 A | 3/1999 | Bauer ........................ 345/339 |
| 5,892,905 A | 4/1999 | Brandt et al. .......... 395/187.01 |
| 5,905,868 A | 5/1999 | Baghai et al. ......... 395/200.54 |
| 5,911,071 A | 6/1999 | Jordan |
| 5,924,096 A | 7/1999 | Draper et al. ................. 707/10 |
| 5,930,512 A | 7/1999 | Boden et al. ............... 395/710 |
| 5,933,582 A | 8/1999 | Yamada ..................... 395/114 |

(Continued)

FOREIGN PATENT DOCUMENTS

| | | |
|---|---|---|
| EP | 0520923 A2 | 12/1992 |
| EP | 0 697 655 A2 | 2/1996 |

(Continued)

OTHER PUBLICATIONS

Copyright Registration for Netcentric Computing: Computing, Communications and knowledge, Reg. Jan. 9, 1998, p. 1.

(Continued)

Primary Examiner—Cao (Kevin) Nguyen
(74) Attorney, Agent, or Firm—Brinks Hofer Gilson & Lione

(57) ABSTRACT

A presentation service architecture in a netcentric computing system that includes a client connected with a web server. A desktop manager service for allowing users to manipulate files and launch applications that are located on the client. The presentation service architecture includes a direct manipulation service, a form service, a input device service, a report and print service, a user navigation service, a web browser service and a window system service. Each of these services of the presentation service architecture provides an optimal arrangement for a business enterprise to use in a netcentric computing system.

19 Claims, 2 Drawing Sheets

U.S. PATENT DOCUMENTS

| | | | |
|---|---|---|---|
| 5,956,479 A | 9/1999 | McInerney et al. | 395/183.14 |
| 6,006,171 A | 12/1999 | Vines et al. | 702/184 |
| 6,012,071 A | 1/2000 | Krishna et al. | 707/522 |
| 6,023,698 A | 2/2000 | Lavey, Jr. et al. | 707/10 |
| 6,029,192 A | 2/2000 | Hill et al. | 709/206 |
| 6,038,560 A | 3/2000 | Wical | 707/5 |
| 6,061,695 A * | 5/2000 | Slivka et al. | 707/513 |
| 6,067,577 A | 5/2000 | Beard | |
| 6,081,518 A | 6/2000 | Bowman-Amuah | |
| 6,112,304 A | 8/2000 | Clawson | 713/156 |
| 6,144,975 A | 11/2000 | Harris, Jr. et al. | 707/901 |
| 6,147,975 A | 11/2000 | Bowman-Amuah | |
| 6,185,573 B1 | 2/2001 | Angelucci et al. | 707/104 |
| 6,195,697 B1 | 2/2001 | Bowman-Amuah | |
| 6,256,773 B1 | 7/2001 | Bowman-Amuah | 717/1 |
| 6,289,382 B1 | 9/2001 | Bowman-Amuah | 709/226 |
| 6,321,261 B1 | 11/2001 | Glass | |
| 6,324,647 B1 | 11/2001 | Bowman-Amuah | |
| 6,332,163 B1 | 12/2001 | Bowman-Amuah | |
| 6,339,832 B1 | 1/2002 | Bowman-Amuah | |
| 6,346,239 B1 | 2/2002 | Bowman-Amuah | |
| 6,366,912 B1 | 4/2002 | Wallent et al. | |
| 6,370,573 B1 | 4/2002 | Bowman-Amuah | |
| 6,385,655 B1 * | 5/2002 | Smith et al. | 709/232 |
| 6,401,097 B1 | 6/2002 | McCotter et al. | 707/102 |
| 6,405,364 B1 | 6/2002 | Bowman-Amuah | 717/101 |
| 6,418,430 B1 | 7/2002 | DeFazio et al. | 707/3 |
| 6,426,948 B1 | 7/2002 | Bowman-Amuah | |
| 6,427,132 B1 | 7/2002 | Bowman-Amuah | |
| 6,434,568 B1 * | 8/2002 | Bowman-Amuah | 707/103 R |
| 6,434,628 B1 | 8/2002 | Bowman-Amuah | |
| 6,438,594 B1 | 8/2002 | Bowman-Amuah | |
| 6,442,547 B1 | 8/2002 | Bowman-Amuah | |
| 6,442,748 B1 | 8/2002 | Bowman-Amuah | |
| 6,449,588 B1 | 9/2002 | Bowman-Amuah | |
| 6,457,066 B1 | 9/2002 | Mein et al. | |
| 6,477,580 B1 | 11/2002 | Bowman-Amuah | |
| 6,477,665 B1 | 11/2002 | Bowman-Amuah | |
| 6,496,850 B1 | 12/2002 | Bowman-Amuah | |
| 6,502,213 B1 | 12/2002 | Bowman-Amuah | |
| 6,523,027 B1 | 2/2003 | Underwood | 707/4 |
| 6,529,909 B1 | 3/2003 | Bowman-Amuah | |
| 6,529,948 B1 | 3/2003 | Bowman-Amuah | 709/217 |
| 6,539,396 B1 | 3/2003 | Bowman-Amuah | |
| 6,542,593 B1 | 4/2003 | Bowman-Amuah | |
| 6,549,949 B1 | 4/2003 | Bowman-Amuah | |
| 6,550,057 B1 | 4/2003 | Bowman-Amuah | |
| 6,556,659 B1 | 4/2003 | Bowman-Amuah | |
| 6,571,282 B1 | 5/2003 | Bowman-Amuah | |
| 6,578,068 B1 | 6/2003 | Bowman-Amuah | |
| 6,584,466 B1 | 6/2003 | Serbinis et al. | 707/10 |
| 6,598,046 B1 | 7/2003 | Goldberg et al. | 707/5 |
| 6,601,192 B1 | 7/2003 | Bowman-Amuah | |
| 6,601,234 B1 | 7/2003 | Bowman-Amuah | |
| 6,606,660 B1 | 8/2003 | Bowman-Amuah | |
| 6,611,867 B1 | 8/2003 | Bowman-Amuah | |
| 6,615,199 B1 | 9/2003 | Bowman-Amuah | |
| 6,615,253 B1 | 9/2003 | Bowman-Amuah | |
| 6,615,258 B1 | 9/2003 | Barry et al. | 709/223 |
| 6,636,242 B2 | 10/2003 | Bowman-Amuah | |
| 6,640,238 B1 | 10/2003 | Bowman-Amuah | |
| 6,640,244 B1 | 10/2003 | Bowman-Amuah | |
| 6,640,249 B1 | 10/2003 | Bowman-Amuah | |
| 6,662,357 B1 * | 12/2003 | Bowman-Amuah | 717/120 |
| 6,697,824 B1 | 2/2004 | Bowman-Amuah | |
| 6,704,303 B1 | 3/2004 | Bowman-Amuah | |
| 6,707,812 B1 | 3/2004 | Bowman-Amuah | |
| 6,715,145 B1 | 3/2004 | Bowman-Amuah | |
| 6,721,713 B1 | 4/2004 | Guheen et al. | |
| 6,742,015 B1 | 5/2004 | Bowman-Amuah | |
| 2001/0052108 A1 | 12/2001 | Bowman-Amuah | |
| 2002/0120553 A1 | 8/2002 | Bowman-Amuah | |
| 2002/0133328 A1 | 9/2002 | Bowman-Amuah | |
| 2003/0058277 A1 | 3/2003 | Bowman-Amuah | |
| 2004/0030705 A1 | 2/2004 | Bowman-Amuah | |
| 2004/0030749 A1 | 2/2004 | Bowman-Amuah | |

FOREIGN PATENT DOCUMENTS

| | | |
|---|---|---|
| EP | 0 697 691 A2 | 2/1996 |
| EP | 0769739 A2 | 4/1997 |
| EP | 0 810 520 A1 | 12/1997 |
| EP | 0829808 A2 | 3/1998 |
| EP | 0841616 A2 | 5/1998 |
| EP | 0915422 A1 | 5/1999 |
| GB | 2315891 A | 2/1998 |
| WO | WO 92/20022 | 11/1992 |
| WO | WO 95/23373 | 8/1995 |
| WO | WO 97/12311 | 4/1997 |
| WO | WO 98/52121 | 11/1998 |
| WO | WO 98/53396 | 11/1998 |
| WO | WO 98/54660 | 12/1998 |
| WO | WO 98/57260 | 12/1998 |
| WO | WO 99/38079 | 7/1999 |

OTHER PUBLICATIONS

Kramer, D., The Java™ Platform: A White Paper, JavaSoft, pp. 1–25, May 1996.

www.empowermentzone.com/javacomp.txt, Sun Microsystems, pp. 1–18, 1996.

Engestrom, J., "Software Agents, Towards Transparent Mediation, A Technology Report for Salama Interactive," Jan. 1999, pp. 1–19.

Morris, K.C. and Flater, D., "Standards–based software testing in a Net–Centric World" pp. 1–8 (cited by Examiner, no date given).

Raje, R. and Chinnasamy, S., "Designing a distributed computing environment for global scale systems: challenges and issues," ACM SIGAPP Applied Computing Review, vol. 7, Issue 1, Spring 1999, pp. 25–30.

Copy of co–pending U.S. Appl. No. 09/386,917, filed Aug. 31, 1999; 340 pages, Inventor Michael K. Bowman–Amuah Copy of co–pending U.S. Appl. No. 10/647,411, filed Aug. 25, 2003; 22 pages, Inventor Michael K. Bowman–Amuah Copy of co–pending U.S. Appl. No. 09/387,654, filed Aug. 31, 1999; 818 pages, Inventor Michael K. Bowman–Amuah Billy B.L. Lim, "Teaching web development technologies in CS/IS curricula," ACM, copyright 1998, pp. 107–111.

Litoiu et al., "A performance engineering tool and method for distributed applications," ACM, pp. 1–14.

Zoller et al., "A toolkit for an automatic, data dictionary based connection of databases to the WWW," ACM, copyright 1998, pp. 706–718.

McDowell et al., "Unloading Java classes that contain static fields," ACM, v. 33(1), Oct. 15, 1997, pp. 56–60.

Orfali, R., Harkey, D., "Client/Server Programming with OS/2 2.0 (2nd Ed.)" 1992, Van Nostrand Reinhold New York, U.S., pp. 10–24, 111–137, 149–160, 588–594, XP002164217, ISBN 0–442–01219–5.

Orfali, R., Harkey, D., Edwards, J., "Intergalactic Client/Server Computing," Byte, McGraw–Hill, Inc., St. Peterborough, U.S., vol. 20, No. 4, Apr. 1, 1995, pp. 108–110, 114, 11, XP000501823, ISSN: 0360–5280.

Smeets, J., Boyer, S., "Internet and Client Server Patent Information Systems: New Services from Derwent," World Patent Information, GB, Elsevier Sciences Publishing, Barking, vol. 20, No. 2, Jun. 1998, pp. 136–139, XP004165804, ISSN 0172–2190.

Orfali, R. Harkey, D., "Client/Server With Distributed Objects," Byte, McGraw–Hill, Inc., St. Peterborough, U.S., vol. 20, No. 4, Apr. 1, 1995, pp 151–152, 154, 156, XP000501827, ISSN 0360–5280.

Aoyama, M., Hanai, Y., Suzuki, M., "An Integrated Software Maintenance Environment: Bridging Configuration Management and Quality Management," Proceedings of the Conference on Software Maintenance, International Conference on Software Maintenance, Washington, US, IEEE Computer Society Press, Oct. 24, 1988 pp. 40–44.

Borsook, P., "Seeking Security. Mainframe Techniques Define System Security. Soon, they'll be Adapted To Distributed Client/Server Systems." Byte, McGraw–Hill, Inc., St. Peterborough, vol. 18, No. 6, May 1, 1993, pp. 119–122, 124, 12, XP000359327, ISSN 0360–5280.

Tanenbaum, A., "Computer Networks—Third Edition," Prentice–Hall International, London, GB, 1996, pp. 28–39, XP002161723.

Blakeley, J.A., "Universal Data Access with OLE DB," Proceedings of IEEE Compcon, U.S. Los Alamitos, IEEE Computer Society Press, Feb. 23, 1997, pp. 2–7.

IBM Technical Disclosure Bulletin, "Security, License Management and Application Metering Process for Controlling Applications in the DOS Environment," IBM Corp., New York, US, vol. 37, No. 11, pp 195–199, Nov. 1, 1994.

Voth, G.R., Kindel, C., Fujioka, J., "Distributed Application Development for Three–Tier Architectures: Microsoft on Windows DNA," IEEE Internet Computing vol. 2, No. 2, Mar./Apr. 1998, USA.

Lambert, N., "A New Patent Search Tool For The Internet. Q–PAT US." Database, US, Cincinnati, vol. 19, No. 4, Aug. 1, 1996.

Abdel–Mottaleb, M., Hsiang–Lung, W., Dimitrova, N., "Aspects of Multimedia Retrieval," Philips Journal of Research, NL, Elsevier, Amsterdam, vol. 50, No. 1, 1996, pp. 227–251.

Olson, M.A., "DataBlade extensions for INFORMIX–Universal Server," Compcon '97 Proceedings, IEEE, 1997, pp. 143–148.

Chamberlin, D.D., "Evolution of Object–Relational Database Technology in DB2," Compcon '97 Proceedings, IEEE, 1997, pp. 131–135.

Nori, A.K., Kumar, S., "Bringing Objects to the Mainstream," Compcon '97 Proceedings, IEEE, 1997, pp. 136–142.

"Data Joiner: A Multidatabase Server Version 1," White Paper, IBM Data Management Solutions, IBM, USA, second edition (May 1995).

"Effective Systems management for DB2 Universal Database," White Paper, IBM Data Management Solutions, IBM, USA, first edition (Dec. 1996).

Pleas, K., "Ole's Missing Links," BYTE, McGraw–Hill Inc., St. Peterborough, US, vol. 21, No. 4, Apr. 1, 1996, pp. 99–102 X–000586036, ISSN 0360–5280.

Burke, M.G., Choi, J.D., Fink, S., Grove, D., Hind, M., Sarkar, V., Serrano, M.J., Sreedhar, V.C., Srinivasan, H., "The Jalapeno Dynamic Optimizing Compiler for Java," Java '99, San Francisco, CA, US, ACM Jun. 12, 1999, pp. 129–141 XP002134655.

Cramer, T., Friedman, R., Miller, T., Seberger, D., Wilson, R., Wolczko, M., "Compiling Java Just in Time," IEEE Micro. IEEE Inc., New York, US, vol. 17, No. 3, May 1, 1997, pp. 36–43 XP000656035, ISSN: 0272–1732.

Bank, J.s., "Java Security," Dec. 8, 1995, pp. 1–13, X–002092325.

Koved, L., Nadalin, A.J., Neal, D., Lawson, T., "The Evolution of Java Security," IBM, The Ultimate Resource for Java Developers, 1998, pp. 1–14, XP002144222.

Touch, J., Hughes, A.S., "LSAM proxy cache: a multicast distributed virtual cache," Computer Networks and ISDN Systems, North Holland Publishing, Amsterdam. NL (3W3 Workshop, University of Manchester, Jun. 15–17th, 1998), vol. 30, No. 22–23, Nov. 25, 1998, pp. 22–23.

Clip, P., "Servlets: CGI The Java Way," BYTE, McGraw–Hill, Inc., St. Peterborough, US, vol. 23, No. 5, May 1, 1998, pp. 55–56.

Gwertzman, J.S., Seltzer, M., "The Case For Geographical Push–Caching," Workshop on Hot Topics in Operating Systems, May 4, 1994, pp. 51–55.

Chamberlin, D.D., "Using the new DB2: IBM's object–relational database system," Morgan Kaufmann Publishers, USA, 1996, ISBN 1–55860–373–5, ppl. 561–567.

North, K., "Database Programming with OLE and ActiveX," DBMS, US, M&T Publ., Redwood City, CA, US, Nov. 1996, pp. 1–8.

Joshi, S.M., Veeramani, D., "Book Review. Increasing the Interoperability of CAD Packages. CAD and Office Integration: OLE for Design and Modeling—A New Technology for CA–Software," Computer Aided Design, Elsevier Publishers BV, Barking, GB, vol. 29, No. 12, Dec. 1, 1997, pp. 907.

Schmoll, J. "Wird OLE for Process Controll (OPC) Ein Neuer Industriestandard?" , Automatisierungstechnische Praxis, ATP, Oldenbourg Verlag, Munchen, DE, vol. 39, No. 5, May 1, 1997, pp. 11–12, 14–17.

Williams, S., Kindel, C., "The Component Object Model. The Foundation for OLE Services" Dr. Dobb's Special Report. Winter, 1994/1995, vol. 19, No. 16, Dec. 21, 1994 pp. 14–22.

Smith, D., Tilley, S.R., Weiderman, N. H., "Transforming Legacy Application into Object–Oriented Applications Workshop, will Net–Centric Computing Change the Reengineering Equation?" 1996, pp. 1–4.

Hamilton, M.A., "Java and the shift to Net–centric computer," Sun Microsystems, Computer, paper published Aug. 1996, ISSN: 0018–9162, Aug. 1996, pp. 31–39.

Ryan, H.W., Sargent, S.R., Boudreau, T.M., Arvanitis, Y.S., Taylor, S.J., Mindrum, C.; "Practical Guide to Client/Server Computing," Second Edition, pp. 1–774; Copyright 1998, CRC Press LLC, Boca Raton, FL, United States.

Ryan, H.W.; Alber, M.W.; Taylor, S.J.; Chang, R.A.; Arvanitis, Y.S.; Davis, M.C.; Mullen, N.K.; Dove, S.L; Mehra, P.N.; Mindrum, C.; "Netcentric Computing, Computing, Communications and Knowledge," pp. 1–413; Copyright 1998, CRC Press LLC, Boca Raton, FL, United States.

* cited by examiner

PRESENTATION SERVICE ARCHITECTURES FOR NETCENTRIC COMPUTING SYSTEMS

This application claims the benefit under 35 U.S.C. §119(e) of U.S. provisional application Ser. No. 60/156,962 filed on Oct. 1, 1999.

FIELD OF THE INVENTION

The present invention relates generally to computing systems, and more particularly to presentation service architectures for netcentric computing systems.

BACKGROUND OF THE INVENTION

Computer based business solutions have existed for various different types of transactions since the mid-to-late 1960s. During this time period, the technology focused on the use of batch technology. In batch processing, the business user would present a file of transactions to the application. The computer system would then run through the transactions, processing each one, essentially without user intervention. The system would provide reporting at some point in the batch processing. Typically, the reports would be batch printed, which in turn, would be used by the business user to correct the input transactions that were resubmitted along with the next batch of transactions.

In the 1970s, businesses began a transition to on-line, interactive transactions. At a conceptual level, this processing opened up the file of transactions found in batch transactions and allowed the user to submit them one at a time, receiving either immediate confirmation of the success of the transaction or else feedback on the nature of the transaction error. The conceptually simple change of having the user interact with the computer on a transaction-at-a-time basis caused huge changes in the nature of business computing. More important, users saw huge changes in what they could do on a day-to-day basis. Customers were no longer forced to wait for a batch run to process the particular application. In essence, the computer had an impact on the entire work flow of the business user.

Along with the advent of on-line interactive systems, it was equally significant that the systems provided a means for the business user to communicate with others in the business as the day-to-day business went along. This capability was provided on the backbone of a wide area network (WAN). The WAN was in itself a demanding technology during this time period and because of these demands telecommunications groups emerged within organizations, charged with the responsibility to maintain, evolve, and manage the network over a period of time.

The theme of the 1980s was database management systems (DBMSs). Organizations used and applied database technology in the 1970s, but in the 1980s they grew more confident in the application of DBMS technology. Because of the advances in network technology, the focus was now on the sharing of data across organizational and application boundaries. Curiously, database technology did not change the fundamental way in which business processing was done. DBMS made it more convenient to access the data and to ensure that it could be updated while maintaining the integrity of the data.

In the 1990s, technology began to shift toward client/server computing. Client/server computing is a style of computing involving multiple processors, one of which is typically a workstation, and across which a single business transaction is completed. Using the workstation, the transaction entered by the user could now be processed on a keystroke-by-keystroke basis.

Furthermore, there was a change in the communications. With client/server, users could communicate with others in the work group via a local area network (LAN). The LAN permitted workstation-to-workstation communications at speeds of 100 to 1,000 times what was typically available on a WAN. The LAN was a technology that could be grown and evolved in a local office with little need for direct interaction from the telecommunications group.

During the late 1990s, the Internet began to receive widespread use by consumers and businesses. In the business world, the Internet has caused the concept of business users to expand greatly because of the way in which computers are now capable of being interconnected. In addition, the cost of computers has dropped to the point that it is affordable for almost every household to own a computer if they so desire. As such, a need to expand the reach of computing both within and outside the enterprise, and that enables the sharing of data and content between individuals and applications has developed.

SUMMARY OF THE INVENTION

One aspect of the present invention discloses a presentation service architecture for a netcentric computing system. In the preferred embodiment of the present invention, the presentation service architecture includes a web server that is connected with a client. The presentation service architecture includes desktop manager services, direct manipulation services, form services, input device services, report and print services, user navigation services, web browser services and windows system services. These services are preferentially located on the client and interact with the web server to generate and pass information to and from the web server and/or client during operation.

The desktop manager service is provided to allows users to manipulate files and launch applications that are located on the client. The direct manipulation service allows users to manage at least one software application object by manipulating visual representations of the application objects located on the client. The form service enables applications from the web server to use at least one field to display and collect data from the client.

In the preferred embodiment of the present invention, the presentation service architecture includes input device services for detecting user inputs from at least one input device located on the client. The report and print service enables on-screen previewing and printing of documents that contain data that are generated on the client by the web server. The user navigation service provides users with the ability to access or navigate between functions within or across applications that are generated on the client by the web server. The web browser service allows users to view and interact with applications and documents also located on the client. The window system service for providing a base functionality for creating and managing a graphical user interface is also located on the client.

In a netcentric computing system, an effective presentation service architecture controls how users interact with the web server and thereby the netcentric computing system. The services that the presentation service architecture perform include capturing user actions, generating events, presenting data to the user and assisting in the management of the window flow. During operation, the preferential presentation service architecture includes services that are capable of providing applications that satisfy the needs of the user that is using a client that may be located hundreds of miles away. The web browser services provide this interaction by allowing the client and the web server to interact and pass information to and from each other.

Further objects and advantages of the present invention will be apparent from the following description, reference being made to the accompanying drawings wherein preferred embodiments of the present invention are clearly shown.

DETAILED DESCRIPTION OF THE PREFERRED EMBODIMENTS OF THE PRESENT INVENTION

Figure 1:
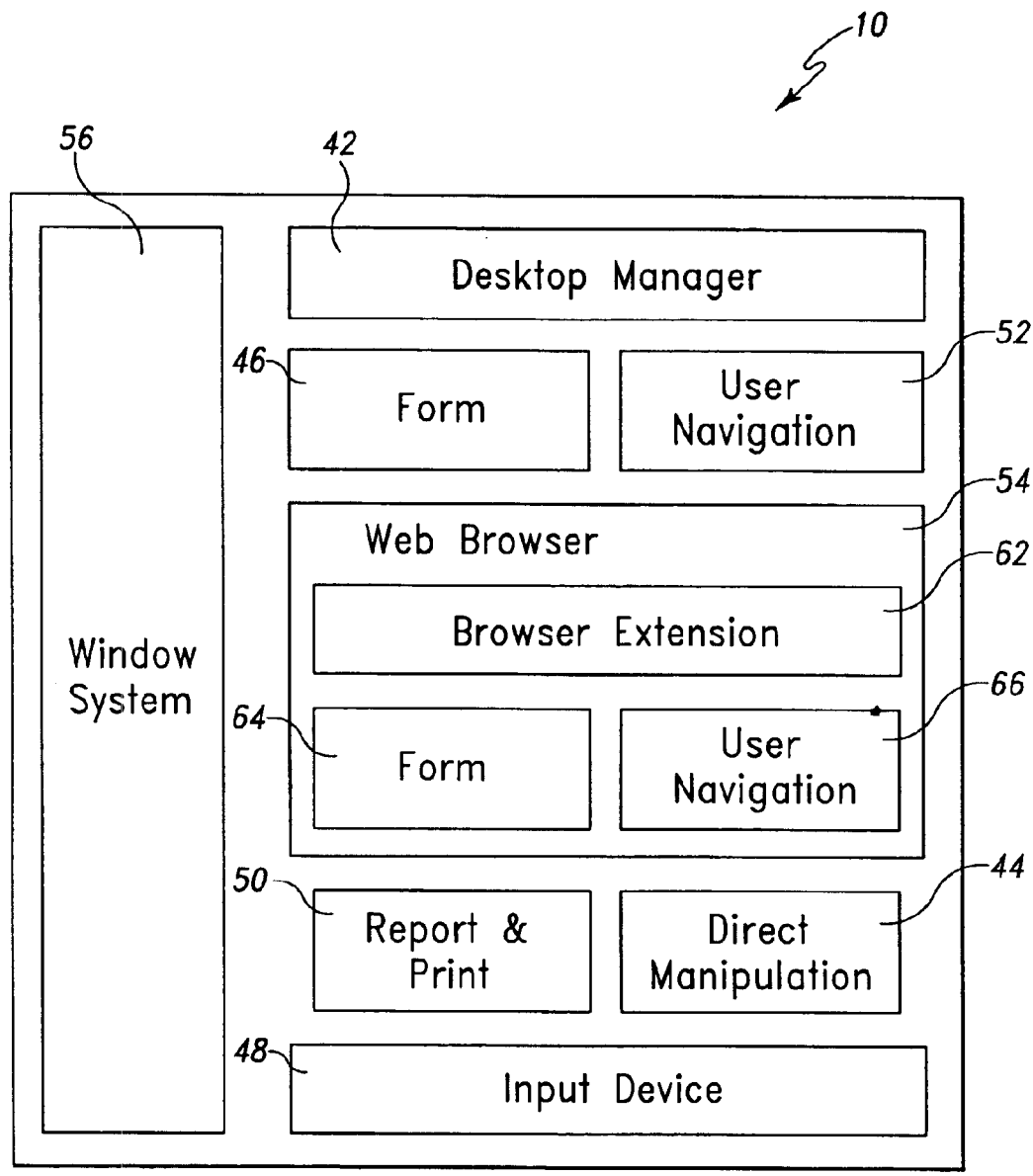
FIG. 1 illustrates a preferred presentation service architecture for a netcentric computing system.
Figure 2:
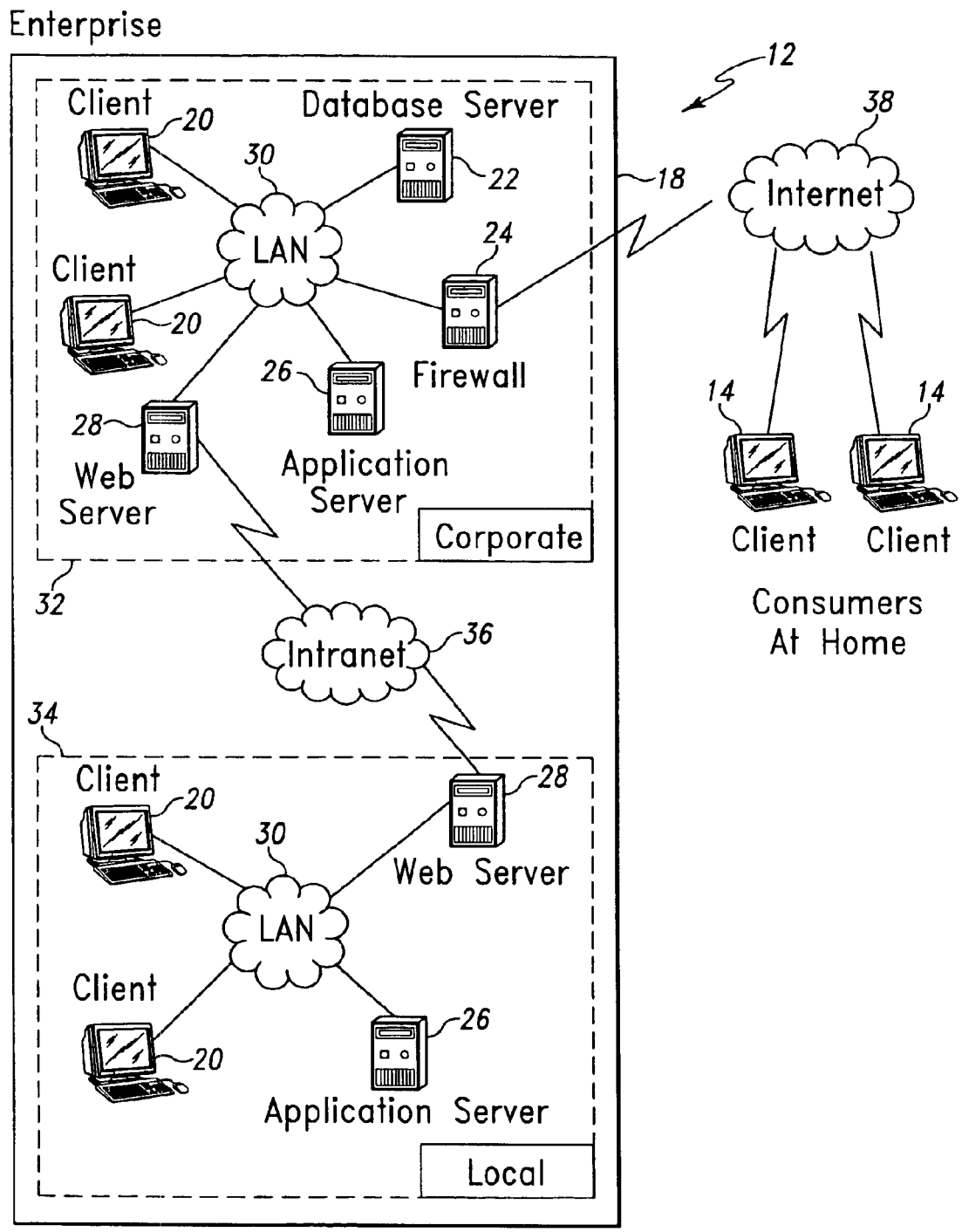
FIG. 2 illustrates a representative netcentric computing system.

Referring to FIGS. 1 and 2, the present invention discloses a presentation service architecture 10 for a netcentric computing system 12 that includes at least one client 14 connected with at least one web server 16. Referring to FIG. 2, the physical picture of an illustrative example of a netcentric computing system 12 is illustrated. A business enterprise 18 may include at least one client 20, at least one database server 22, at least one firewall 24, at least one application server 26, at least one web server 28 and a LAN connection 30, connected as illustrated in FIG. 2. The LAN connection 30 is used to interconnect various components or computing devices that are located at a first enterprise location 32 within the business enterprise 18. Those skilled in the art would recognize that various types of LAN connections 30 exist and may be used in the present invention.

For the purpose of the present invention, the firewall 24 is used to isolate internal systems from unwanted intruders. As known in the art, firewalls 24 isolate the web servers 28 from all Internet traffic that is not relevant to the netcentric computing system 12. In the preferred embodiment, the only requests allowed through the firewall 24 are for services on the web servers 28. All requests for other applications (e.g., FTP, Telnet) and other IP addresses are blocked by the firewall 24.

The web servers 28 are the primary interface to the clients 14, 20 for all interactions with the applications or services of the netcentric computing system 12. The main task of the web servers 28 is to authenticate the clients 14, 20, establish a secure connection from the clients 14, 20 to the web servers 28 using encrypted messages, and allow the applications the clients 14, 20 are using to transparently access the resources of the netcentric computing system 12. The web servers 28 are responsible for accepting incoming HTTP messages and fulfilling the requests. For dynamic HTML page generation, requests are forwarded to the application servers 26. Static pages, such as help pages, are preferably generated by the web servers 28.

In the preferred embodiment, the primary function of the application servers 26 is to provide a link through which the web servers 28 can interact with the clients 14, 20, trigger business transactions, and send back resulting data to the clients 14, 20. A fundamental role of the application servers 26 is to manage the logical flow of the transactions and keep track of the state of the sessions. The application servers 26 are also responsible for managing all sessions.

Further, in the preferred embodiment of the present invention, the main purpose of the database servers 22 is to handle an application log. All requests sent to the web servers 28 and application servers 26 as well as responses are logged in the application log. The application log is preferentially used for traceability. In the preferred embodiment, requests are logged in the application log directly by the application server 26. Those skilled in the art would recognize that any number of data items can be monitored by the application log.

As further illustrated in FIG. 2, a second business enterprise location 34 may be connected with the first business enterprise location 32 using a intranet connection 36. Those skilled in the art would recognize that various intranet connections 36 exist and may be used in the present invention. As those skilled in the art would recognize, the intranet connection 36 allows the computing resources of the second business enterprise location 34 to be shared or connected with the computing resources available at the first business enterprise location 32. Although not illustrated, several other enterprise locations may be connected with the netcentric computing system 12.

In the preferred embodiment the firewall 24 of the first business enterprise location 32 is connected with a dedicated Internet connection 38 to a plurality of remote clients 14. Preferentially, the remote clients 14 that are connected to the Internet connection 38 access data at the business enterprise 18 through the Internet connection 38 using a browser application. The Internet connection 38 gives the remote clients 14 the ability to gain access to information and data content contained on the database server 22, the application server 26 and the web server 28. For a detailed discussion of the architecture for the preferred netcentric computing system 12, refer to co-pending U.S. patent application Ser. No. 09/676,227 entitled ARCHITECTURES FOR NETCENTRIC COMPUTING SYSTEMS, which was filed on Sep. 29, 2000, and is hereby incorporated by reference, in its entirety.

In the preferred embodiment, the presentation service architecture 10 uses various software applications to manage the human-computer interface in the netcentric computing system 12. These software applications capture user actions and generate resulting events, present data to the user, and assist in the management of the dialog flow of processing. Typically, the presentation service architecture 10 is only required by the clients 14, 20 in the netcentric computing system 12. During operation, the applications in the presentation service architecture 10 pass information and interact with the web server 28.

As set forth in FIG. 1, the preferred presentation service architecture 10 consists of software applications that provide desktop manager services 42, direct manipulation services 44, forms services 46, input device services 48, report and print services 50, user navigation services 52, web browser services 54 and window system services 56. The term service, as used in this disclosure, should be construed to include software applications that enable and support certain features of the preferred presentation service architecture 10. Those skilled in the art of programming should recognize that various, software applications exist and may be created for use in the preferred embodiment of the present invention.

The desktop manager services 42 provides for implementing the "desktop metaphor," which is commonly used to refer to a style of user interface that emulates a physical desktop. It allows the user to place documents on the desktop, launch applications by clicking on a graphical icon, or discard files by dragging them onto a picture of a wastebasket. The desktop manager service 42 includes facilities and devices for launching applications and desktop utilities and managing their integration. Most windowing systems contain elementary desktop manager functionality (e.g., the Windows 95 and 98 desktop), but often more user-friendly or functional desktop manager services are required. Some representative products that provide desktop manager services include Norton Navigator, Microsoft Windows 95 and 98 Task Bar, Xerox Tabworks and Starfish Software Dashboard.

The direct manipulation services 44 use applications to provide a direct manipulation interface (often called "drag and drop"). A direct manipulation interface allows users to manage multiple application objects by manipulating visual representations of those objects on the clients 14, 20. For example, a user may sell stock by dragging stock icons out of a portfolio icon and onto a trading floor icon.

The direct manipulation services 44 can be divided into display validation services 58 and input validation services 60. The display validation services 58 enable applications to represent application objects as icons and control the display characteristics (color, location, etc.) of these icons on the clients 14, 20. The input/validation services 60 enable applications to invoke validation or processing logic when an end user "acts on" an application object. "Acting on" an object may include single clicking, double clicking, dragging or sizing. The method of selecting an object may vary from application to application, however, those skilled in the art would recognize that several methods of selecting or acting on an object exist and are envisioned by the present invention.

The form services 46 include applications that use fields to display and collect data. A field may be a traditional 3270-style field used to display or input textual data, or it may be a graphical field such as a check box, a list box, or an image. The form services 46 provide support for display, input-validation, mapping support and field interaction management.

In the preferred embodiment, the form services 46 enables applications to use fields to display and collect data. During operation, the form services 46 provide support for displaying objects by being capable of displaying various data types (e.g., text, numeric, date, etc.) in various formats (e.g., American/European data, double-byte characters, icons, etc.). In addition, the form services 46 enable applications to collect information from the user, edit it according to the display options, and perform basic validation such as range or format checks.

The form services 46 eliminates the need for applications to communicate directly with the window system service 56; rather, applications retrieve or display data by automatically copying the contents of a window's fields to a copybook structure in memory. These services may also be used to automate the merging of application data with predefined electronic form templates. The form services 46 is capable of coordinating activity across fields in a window by managing field interdependencies and invoking application logic based on the state of fields and user actions. For example, a field interaction manager in the form services 46 may disable the "OK" button until all required input fields contain valid data. These services significantly reduce the application logic complexity inherent to an interactive windowed interface.

The input device services 48 detect user input from a variety of input technologies, such as pen based, voice recognition and response systems, keyboards, touchscreens, mice, digital cameras, and scanners. Voice response systems are used to provide prompts and responses to users through the use of phones. Voice response systems have scripted call flows, which guide a caller through a series of questions. Based on the user's keypad response, the voice response system can execute simple calculations, make database calls, call a mainframe legacy application, or call out to a custom C routine. Representative voice response system vendors include VoiceTek and Periphonics.

Voice recognition systems are becoming more popular in conjunction with voice response systems. Users are able to speak to the phone in addition to using a keypad. Voice recognition can be an extremely powerful technology in cases where a keypad entry would be limiting (e.g., date/time or location). Sophisticated voice recognition systems have been built that support speaker independence, continuous speech and large vocabularies.

Those skilled in the art would recognize that various input device services 24 exist and may be used with the present invention. These applications within the input device services 48 will need to be tailored to the needs of the particular enterprise using the presentation services architecture 10. As such, those skilled in the art would recognize that the scope of the present invention should not be limited by the illustrative input devices set forth briefly above.

The report and print services 50 support the creation and on-screen previewing of paper or photographic documents, which contain screen data, application data, graphics or images. In order to perform optimally, the report and print services 50 must take into consideration varying print scenarios common in netcentric computing system environments, including varying graphics/file types (Adobe, .PDF, GIF, JPEG), page margins and breaks, HTML constructs including tables and frames, headers/titles, extended character set support, etc. Those skilled in the art would recognize that various report and print services 50 may be used in the present invention.

The user navigation services 52 provide a user with a way to access or navigate between functions within or across applications. A common method for allowing a user to navigate within an application is to list available functions or information by means of a menu bar with associated pull-down menus or context-sensitive pop-up menus. This method conserves screen real estate by hiding functions and options within menus, but for this very reason can be more difficult for first-time or infrequent users. This point is important when implementing electronic commerce solutions where the target customer may use the application only once or very infrequently (e.g., purchasing auto insurance). A text-based menuing system that provides a list of applications or activities for the user to choose from may also be used. Those skilled in the art would recognize that various user navigation services 52 may be incorporated in the present invention as they become available.

The web browser services 54 provide applications that allow users to view and interact with applications and documents made up of varying data types, such as text, graphics and audio that are stored or located on the netcentric computing system 12. As such, in the preferred embodiment the web browser services 30 provide support for navigation within and across documents and files no matter where they are located through the use of links embedded into the document content or the file structure. The web browser services 54 retain the link connection, i.e., document physical location, and mask the complexities of that connection from the user.

As known in the art, much of the appeal of web browsers is the ability to provide a "universal clients" that offers users a consistent and familiar user interface from which all types of applications can be executed and all types of documents can be viewed, regardless of the type of operating system or machine as well as independent of where these applications and documents reside. Web browsers employ standard protocols, such as Hypertext Transfer Protocol (HTTP) and File Transfer Protofocol (FTP) to provide seamless access to documents across machine and network boundaries.

Examples of products that provide web browser services include Netscape Navigator. One of the original browsers, Navigator currently has a large share of the installed browser market and strong developer support, and Microsoft Internet Explorer (IE). Leveraging the market strength of Windows, Internet Explorer is tightly integrated with Windows and supports the major features of the Netscape Navigator as well as Microsoft's own ActiveX technologies.

It should be noted that the distinction between desktop and web browsers may well disappear with the release of products that integrate web browsing into the desktop and give a user the ability to view directories as through they were web pages. Web browser, as a distinct entity, may even fade away with time. As known in the art, browsers require new or at least revised development tools for working with new languages and standards such as HTML and Java. Many browser content development tools have flooded the market recently. The following are several representative products that provide browser services.

Netscape LiveWire and LiveWire Pro—visual tool suite designed for building and managing complex, dynamic Web sites and creating live on-line applications. Symantec Visual Café the first complete Rapid Application Development (RAD) environment for Java. With Visual Café, one can assemble complete Java applets and applications from a library of standard and third-party objects, without writing source code, for very simple applications. Visual Café also provides an extensive set of text-based development tools. Microsoft FrontPage—provides an integrated development environment for building Web sites, including WebBots, which provide services for implementing common features such as search engines and discussion groups. Microsoft Visual J++—a product similar to Visual C++, VJ++ allows the construction of Java applications through an integrated graphical development environment.

As illustrated in FIG. 1, the web browser services 54 can be further subdivided into browser extension services 62, web browser form services 64 and web browser user navigation services 66. The browser extension services 62 provide support for executing different types of applications from within the web browser services 54. These applications provide functionality that extends web browser capabilities. The key web browser extensions 62 are plug-ins, helper application/viewers, Java applets, Active/X controls and Java beans.

A plug-in is a software program that is specifically written to be executed within a browser for the purpose of providing additional functionality that is not natively supported by the browser, such as viewing and playing unique data or media types. For example, early browsers did not natively support multimedia data types such as sound. Sound plug-ins were used by the browser to play back the sound component of a document. Other plug-ins allow mainframe 3270-based applications to be viewed directly or mapped into a more friendly form-style interface. Plug-ins cover everything from streaming video to interactive conferencing, and new ones are being released every week.

Typically, to use a plug-in, a user is required to download and install the plug-in on his/her client machine. Once the plug-in is installed, it is integrated into the web browser on the client machine. The next time the web browser opens a web page that requires that plug-in to view a specific data format, the browser initiates the execution of the plug-in. Special plug-in APIs are used when developing plug-ins. Until recently, plug-ins were only accessible from the Netscape browser. Now, other browsers such as Microsoft's Internet Explorer are beginning to support plug-in technology as well. However, plug-ins written for one browser will generally need to be modified to work with other browsers. Also, plug-ins are operating-system dependent. Therefore, separate versions of a plug-in are required to support Windows, Macintosh and Unix platforms.

Unlike a plug-in, a helper application is not integrated with the web browser, although it is launched from a web browser. A helper application generally runs in its own window, contrary to a plug-in, which is generally integrated into a web page. Like a plug-in, the user installs the helper application. However, because the helper application is not integrated with the browser, the user tends to do more work during installation specifying additional information needed by the browser to launch the helper application.

A java applet is a program written in Java that runs within or is launched from the client's browser. This program is loaded into the client device's memory at run time and then unloaded when the application shuts down. A Java applet can be as simple as an animated object on an HTML page or can be as complex as a complete windows application running within the browser.

A ActiveX control is also a program that can be run within a browser, from an application independent of a browser, or on its own. ActiveX controls are components, developed using Microsoft's standards that define how software components should be built. Although Microsoft is positioning ActiveX controls to be language- and platform-independent, today they are limited to the Intel platforms. Within the context of a browser, ActiveX controls add functionality to Web pages. These controls can be written to add new features such as dynamic charts, animation or audio. Plug-ins and ActiveX controls are functionally similar, but ActiveX controls provide more functionality, such as a self-installing capability.

JavaBeans—JavaSoft's (i.e., Sun's Java development and marketing unit) counterpart to ActiveX controls, based on CORBA standards. JavaBeans can also be anything from small visual controls, such as a button or a date field, to full-fledged applications, such as word processors, spreadsheets, browsers, etc. Viewers and plug-ins are some of the most dynamic segments of the browser market due to quickly changing technologies and companies.

The following are examples of plug-in execution products that may be used in the preferred presentation services architecture 10: Real Audio—a plug-in designed to play audio in real-time on the Internet without needing to download the entire audio file before you can begin listening. VDOLive—a plug-in designed to view real-time video streams on the Internet without needing to download the entire video file before you can begin viewing; similar in concept to Real Audio. Macromedia Shockwave—a plug-in used to play back complex multimedia documents created using Macromedia Director or other products. Internet Phone—one of several applications that allows two-way voice conversation over the Internet, similar to a telephone call. Information Builder's Web3270—a plug-in that allows mainframe 3270-based applications to be viewed across the Internet from within a browser. The Web3270 server provides translation services to transform a standard 3270 screen into an HTML-based form. Interest in Web3270 and similar plug-ins has increased with the Internet's ability to provide customers and trading partners direct access to an organization's applications and data. "Screen scraping" viewers can bring legacy applications to the Internet or intranet very quickly.

The web browser form services 64, like the forms services 46 outside of the web browser services 54, enable applications to use fields to display and collect data. The difference between the two services is the technology used to develop the forms that are used by the web browser form services 64. The most common type of web browser form services 64 within the web browser is Hyper-Text Mark-up Language (HTML). Currently, HTML browsers support only the most rudimentary forms, basically providing the presentation and collection of without validation or mapping support. When implementing forms with HTML, additional services may be required such as client side-scripting (e.g., VB Script of JavaScript).

Microsoft has introduced ActiveX documents that allow forms such as Word documents, Excel spreadsheets, and Visual Basic windows to be viewed directly from Internet Explorer just like HTML pages. Today, different technologies are used to create forms that are accessible outside of the browser from those that are accessible within the browser. However, with the introduction of ActiveX documents, these differences are getting narrower. Those skilled in the art would recognize that as the web browser services 54 expand various other types of web browser form services 64 will be readily incorporated into the present invention.

The web browser user navigation services 66, like the user navigation services 52 outside the web browser services 54, provide users with a way to access or navigate between functions within or across applications located on the web server 28. The preferred web browser user navigation services 66 can be subdivided into three categories: hyperlink, customized menu and virtual reality services.

A hyperlink has popularized the use of underlined key words, icons and pictures that act as links to additional pages. The hyperlink mechanism is not constrained to a menu, but can be used anywhere within a page or document to provide the user with navigation options. It can also take a user to another location within the same document or a different document altogether or even a different server or company for that matter. There are three types of hyperlinks: hypertext, icon and image map.

Hypertext is very similar to the concept of "Context Sensitive Help" in Windows, where the reader can move from one topic to another by selecting a highlighted word or phrase. Icon is similar to the hypertext menu above, but selections are represented as a series of icons. The HTML standard and popular browsers provide hyperlinking services for non-text items such as graphics. Image map is also similar to the hypertext menus, but selections are represented as a series of pictures. A further evolution of image map menu is to display an image depicting some place or thing (e.g., a picture of a bank branch with tellers and loan officers).

A customized menu is a common method for allowing a user to navigate within an application is to list available functions or information by means of a menu bar with associated pull-down menus or context-sensitive pop-up menus. This method conserves screen real estate by hiding functions and options within menus; but, for this very reason, it can be more difficult for first-time or infrequent users. This point is important when implementing electronic commerce solutions in which the target customer may use the application only once or very infrequently (e.g., pricing and purchasing auto insurance). Also, browsers themselves can be programmed to support customized menus. This capability might be more applicable for intranet environments where the browsers need to be customized for specific business applications.

A virtual reality service or virtual environment interface takes the idea of a graphical map to the next level by creating a three-dimensional environment for the user to "walk" around in. Popularized by such PC games as Doom, the virtual environment interface can be used for business applications. The consumer can walk through a shopping mall and into and around virtual stores or "fly" around a three-dimensional (3D) virtual version of a resort complex being considered for holiday.

To create sophisticated user navigation interfaces such as these requires additional architectural services and languages. The Virtual Reality Modeling Language (VRML) is one such language gaining in popularity on the Internet. Additionally, many tool kits and code libraries are available to speed development of virtual reality services. Those skilled in the art would recognize that as virtual reality services develop, they may be incorporated into the presently disclosed invention.

The windows system services 56, which is typically part of the operating system used on the clients, provide the base functionality for creating and managing a graphical user interface on the workstations. As known in the art, a graphical user interface can detect user actions, manipulate windows on the display, and display information through windows and graphical controls. Examples of windows system services 32 include Microsoft Windows, Windows 95198 and Windows NT, Macintosh OS, Presentation Manager for OS/2, and X-Windows/Motif.

Window system services 56 expose their functionality to applications through a set of APIs. For the Microsoft windowing platforms, this API is called Win32, a documented set of over 400 C functions that allow developers to access the functionality of the windowing system as well as various other operating system functions. Developers are able to call the Win32 API or its equivalent on other platforms directly, using a C language compiler; however, most development is done using higher-level development languages, such as Visual Basic or PowerBuilder, which make the lower level calls to the operating system on behalf of the developer.

While the invention has been described in its currently best known modes of operation and embodiments, other modes and embodiments of the invention will be apparent to those skilled in the art and are contemplated. For other features, advantages and combinations of the present invention refer to U.S. provisional application Ser. No. 60/156, 962, entitled NETCENTRIC AND CLIENT/SERVER COMPUTING which is herein incorporated by reference, in its entirety.

What is clamed is:

1. A presentation service architecture for a netcentric computing system, comprising:
   a client connected with a web server;
   a desktop manager service for allowing users to manipulate files and launch applications located on said client;
   a direct manipulation service for allowing users to manage at least one software application object by manipulating visual representations of said application objects located on said client;

a input device service for detecting user input from at least one input device located on said client;

a report and print service for enabling on-screen previewing and printing of documents that contain data that are generated on said client by said web server;

a user navigation service for providing users with the ability to access or navigate between functions within or across applications that are generated on said client by said web server;

a web browser service for allowing users to view and interact with applications and documents located on said client and said web server, wherein said web browser service is configured to enable applications to use fields to display data and collect user input data;

a form service for enabling applications from said web server to use at least one field to display and collect data from said client outside of said web browser service; and a window system service for providing a base functionality for creating and managing a graphical user interface.

2. The presentation service architecture of claim 1, wherein said direct manipulation service includes display services and input/validation services.

3. The presentation service architecture of claim 2, wherein said display services enable applications to represent application objects as at least one icon and control the display characteristics of said icon.

4. The presentation service architecture of claim 2, wherein said input/validation services enable applications to invoke validation logic when a user selects an application object.

5. The presentation service architecture of claim 1, wherein said web browser services include web browser extension services, web browser form services and web browser user navigation services.

6. The presentation service architecture of claim 5, wherein said web browser extension services is at least one of plug-ins, helper application/viewers, Java applets, Active/X controls or Java beans or combinations thereof.

7. The presentation service architecture of claim 5, wherein said web browser user navigation services provide users on said client with the ability to access or navigate between functions within or across applications located on said web server.

8. The presentation service architecture of claim 5, wherein said web browser user navigation services is at least one of hyperlinks, customized menus or virtual reality services or combinations thereof.

9. The presentation services architecture of claim 1, wherein said user navigation service is operable outside of said web browser service.

10. The presentation services architecture of claim 9, wherein said user navigation service is configured to provide users with the ability to access or navigate between functions with a list of functions included in at least one of a pull-down menu bar, a context-sensitive pop-up menu or a text-based menu.

11. The presentation services architecture of claim 1, wherein said form service is configured to allow applications to copy the contents of said at least one field to a copybook structure stored in said client for retrieval or display by applications.

12. The presentation services architecture of claim 1, wherein said form service is configurable to manage field interdependencies, invoke application logic based on the state of said at least one field, and provide validation of collected data.

13. A method of providing a presentation service architecture for a netcentric computing system, comprising the steps of:

providing at least one client connected with a web server;

manipulating files and launching applications with a desktop manager service on said client;

allowing users to manage at least one software application object by manipulating visual representations of said application objects with a direct manipulation service on said client;

detecting user inputs from at least one input device with an input device service located on said client;

previewing and printing documents that contain data with a report and print service located on said client;

accessing or navigating between functions within or across applications on the web server with a user navigation service on said client;

viewing and interacting with applications and documents on said web server with a web browser service on said client, wherein said web browser service includes web browser extension services, web browser form services and web browser user navigation services, said web browser form services enables applications to use fields to display and collect data within said web browser service on said client;

displaying and collecting data with a forms service on said client, wherein said forms service and said user navigation service are operated outside of said web browser service, said forms service enables applications from said web server to use at least one field to display various data types on said client and perform validation of said collected data; and providing a window system service that is capable of creating and managing a graphical user interface on said client.

14. The method of claim 13, wherein said web browser extension services is at least one of plug-ins, helper application/viewers, Java applets, Active/X controls or Java beans and combinations thereof.

15. The method of claim 13, wherein said web browser user navigation services provide users on said client with the ability to access or navigate between functions within or across applications located on said web server.

16. The method of claim 13, wherein said web browser user navigation services is at least of hyperlinks, customized menus or virtual reality services.

17. The method of claim 13, wherein navigating between functions comprises the user navigation service listing available functions with at least one of a pull-down menu, a context-sensitive pop-up menu and a text base menuing system.

18. The method of claim 13, wherein displaying and collecting data comprises the forms service enabling applications to retrieve and display data by copying the contents of the at least one field to a copybook structure in memory.

19. The method of claim 13, wherein displaying and collecting data comprises the forms service managing field interdependencies and invoking application logic based on user actions and the state of the at least one field.

* * * * *

UNITED STATES PATENT AND TRADEMARK OFFICE
CERTIFICATE OF CORRECTION

PATENT NO. : 6,988,249 B1
DATED : January 17, 2006
INVENTOR(S) : Yannis S. Arvanitis and Stanton J. Taylor It is certified that error appears in the above-identified patent and that said Letters Patent is hereby corrected as shown below:

Title page,
Item [56], References Cited, U.S. PATENT DOCUMENTS, delete "6,346,239 B1 2/2002 Bowman-Amuah" and insert -- 6,345,239 2/2002 Bowman-Amuah --.
OTHER PUBLICATIONS,
"Gwertzman..." reference, delete "May 4, 1994" and insert -- May 4, 1995 --.

Column 2,
Line 27, delete "allows" and insert -- allow --.

Column 7,
Line 2, delete "clients" and insert -- client --.

Column 10,
Line 37, delete "95198" and insert -- 95/98 --.

Signed and Sealed this

Eighteenth Day of April, 2006

JON W. DUDAS
*Director of the United States Patent and Trademark Office*